US012665672B2

(12) United States Patent　　　　(10) Patent No.:　US 12,665,672 B2

Yanagimachi　　　　　　　　　　　　(45) Date of Patent:　　Jun. 23, 2026

(54) INFORMATION PROCESSING APPARATUS, INFORMATION PROCESSING METHOD, PROGRAM, AND OPTICAL COMMUNICATION SYSTEM

(71) Applicant: NEC Corporation, Tokyo (JP)

(72) Inventor: Shigeyuki Yanagimachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 496 days.

(21) Appl. No.: 18/241,798

(22) Filed: Sep. 1, 2023

(65) Prior Publication Data

US 2024/0080104 A1　　Mar. 7, 2024

(30) Foreign Application Priority Data

Sep. 6, 2022　　(JP) ................................. 2022-141115

(51) Int. Cl.
　　*H04B 10/294*　　　(2013.01)
　　*H04B 10/572*　　　(2013.01)
(52) U.S. Cl.
　　CPC ......... *H04B 10/294* (2013.01); *H04B 10/572* (2013.01)
(58) Field of Classification Search
　　CPC .... H04B 10/27; H04B 10/272; H04B 10/572; H04B 10/70; H04B 10/29; H04B 10/291; H04B 10/293; H04B 10/2939; H04B 10/294
　　USPC ...................................................... 359/337.1
　　See application file for complete search history.

(56) References Cited

U.S. PATENT DOCUMENTS

| | | | | | |
|---|---|---|---|---|---|
| 6,031,644 | A | * | 2/2000 | Utsumi ................ | H04B 10/077 |
| | | | | | 398/95 |
| 11,863,235 | B2 | * | 1/2024 | Ota .................... | H04Q 11/0062 |
| 12,040,838 | B2 | * | 7/2024 | Kim ................. | H04B 10/07955 |
| 12,101,124 | B2 | * | 9/2024 | Kanai ................. | H04B 10/272 |
| 2012/0301141 | A1 | * | 11/2012 | Sakamoto ........... | H04J 14/0212 |
| | | | | | 398/48 |
| 2023/0396902 | A1 | * | 12/2023 | Yoshino .............. | H04J 14/0307 |
| 2024/0080104 | A1 | * | 3/2024 | Yanagimachi ...... | H04J 14/0267 |
| 2024/0187103 | A1 | * | 6/2024 | Nakamura ............ | H04B 10/58 |
| 2024/0214103 | A1 | * | 6/2024 | Okada ................. | H04J 14/0212 |

FOREIGN PATENT DOCUMENTS

JP　　　　2017-511036 A　　　4/2017

* cited by examiner

*Primary Examiner* — Daniel St Cyr
(74) *Attorney, Agent, or Firm* — Sughrue Mion, PLLC

(57)　　　　　　ABSTRACT

There is provided an information processing apparatus including: a specification unit that specifies a route for converting a wavelength of an optical signal from a first wavelength to a second wavelength and transferring the converted optical signal at a relay node, based on a usage state of a wavelength at nodes that perform communication using an optical signal; and a control unit that controls the nodes in such a way as to perform communication using an optical signal in the route when it is determined that the route is reachable, based on a deterioration characteristic of an SN ratio in a wavelength converter that converts a wavelength of an optical signal from the first wavelength to the second wavelength at the relay node.

9 Claims, 12 Drawing Sheets

206

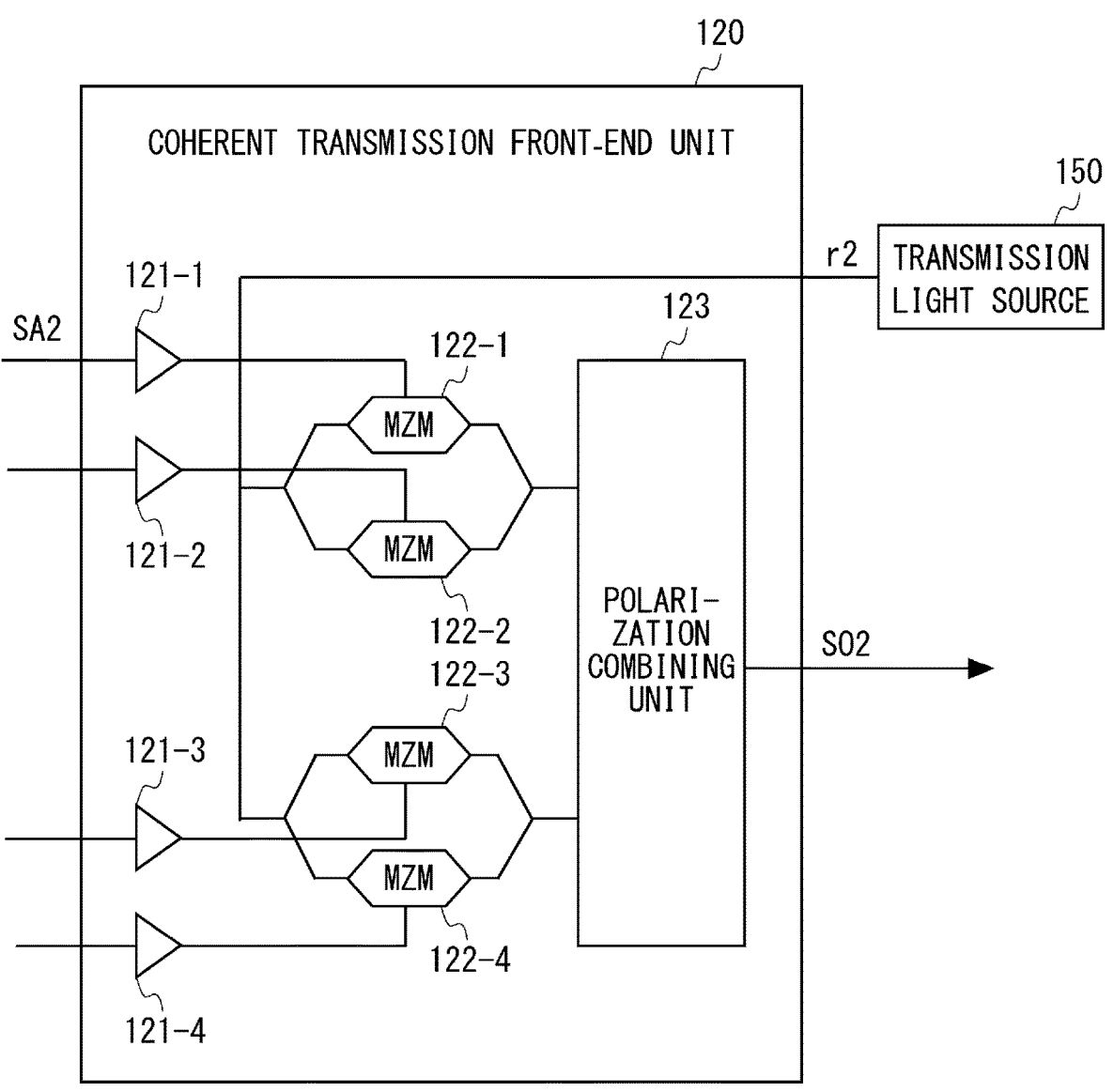
F i g. 7

901

| TRANSMISSION SOURCE NODE ID | TRANSMISSION DESTINATION NODE ID | WAVELENGTH ID | USAGE STATE | COMMUNICATION SPEED |
|---|---|---|---|---|
| NODE A | NODE B | WAVELENGTH A | USING | COMMUNICATION SPEED A1 |
| | | WAVELENGTH B | EMPTY | COMMUNICATION SPEED B |
| | | ... | ... | ... |
| | NODE C | WAVELENGTH A | EMPTY | COMMUNICATION SPEED A2 |
| | | ... | ... | ... |
| | ... | ... | ... | ... |
| NODE B | ... | ... | ... | ... |
| ... | ... | ... | ... | ... |

| NODE ID | INPUT WAVELENGTH ID | OUTPUT WAVELENGTH ID | DETERIORATION CHARACTERISTIC OF SN RATIO AT WAVELENGTH CONVERTER 206 | DETERIORATION CHARACTERISTIC OF SN RATIO AT OPTICAL AMPLIFIER |
|---|---|---|---|---|
| NODE A | WAVELENGTH A | WAVELENGTH A | DETERIORATION CHARACTERISTIC AAA1 | DETERIORATION CHARACTERISTIC AAA2 |
| | | WAVELENGTH B | DETERIORATION CHARACTERISTIC AAB1 | DETERIORATION CHARACTERISTIC AAB2 |
| | | ... | ... | ... |
| | WAVELENGTH B | WAVELENGTH A | DETERIORATION CHARACTERISTIC ABA1 | DETERIORATION CHARACTERISTIC ABA2 |
| | | ... | ... | ... |
| | ... | ... | ... | ... |
| NODE B | ... | ... | ... | ... |
| ... | ... | ... | ... | ... |

Fig. 10

INFORMATION PROCESSING APPARATUS, INFORMATION PROCESSING METHOD, PROGRAM, AND OPTICAL COMMUNICATION SYSTEM

INCORPORATION BY REFERENCE

This application is based upon and claims the benefit of priority from Japanese patent application No. 2022-141115, filed on Sep. 6, 2022, the disclosure of which is incorporated herein in its entirety by reference.

TECHNICAL FIELD

The present disclosure relates to an information processing apparatus, an information processing method, a program, and an optical communication system.

BACKGROUND ART

In recent years, traffic flowing through a network continues to grow rapidly due to a rapid spread of mobile terminals represented by smartphones and large-capacity data communication such as high-definition images caused by advancement of terminals. According to a certain survey, total download traffic of domestic broadband subscribers in a fiscal year of 2020 is about 19 Tbps and continues to increase at an annual rate of about 57%, and traffic is expected to increase in future. In contrast, in a core network that supports large-capacity communication, development of techniques that meet needs for large capacity has been advanced, such as a wavelength division multiplexing technique (WDM) that multiplexes optical signals of a plurality of different wavelengths into one optical fiber and transfers the multiplexed optical signals, and a high-level modulation method such as dual polarization differential quadrature phase shift keying (DP-QPSK), and 16 quadrature amplitude modulation (16-QAM).

With progress of 5th generation (5G) servicing in radio communication, there are increasing needs not only for increasing in capacity but also for reducing in delay of a network. In response to these needs, an all-photonics network that achieves a NW with large capacity and low delay has been proposed in an innovative optical and wireless network (IWON) concept and the like in recent years. The all-photonics network transmits as much light as possible without converting light into an electric signal in a route as much as possible.

Therefore, without restricted to communication capacity of a switch (relay apparatus) for converting light to an electric signal, not only can communication be performed with large capacity, but also delay associated with electric conversion can be reduced, and therefore, it is possible to reduce the delay.

In an optical communication system, since the same wavelength cannot be used in an optical fiber, optical signals having different routes at the same wavelength that arrive at a relay node cannot be accommodated in the same optical fiber. Therefore, the relay node converts a wavelength of the optical signal in a certain route, whereby the optical signal in the route and the optical signal in another route can be accommodated in the same optical fiber. As a technique related to this, for example, Patent Literature 1 (Published Japanese Translation of PCT International Publication for Patent Application, No. 2017-511036) is known. Patent Literature 1 discloses a wavelength converter that converts a wavelength of an optical signal by a reception end and a transmission end using a coherent system.

SUMMARY

However, in the related art, for example, when a wavelength of an optical signal is converted at a relay node in a route, it may be difficult to guarantee arrival in the route.

An example object of the present disclosure is to provide a technique of being able to improve reachability of a route in an optical communication system that converts a wavelength of an optical signal at a relay node in the route.

In a first example aspect of the present disclosure, there is provided an information processing apparatus including: a specification unit configured to specify, based on a usage state of a wavelength at each of a first node, a second node, and a third node configured to perform communication using an optical signal, a route for converting a wavelength of an optical signal from a first wavelength to a second wavelength and transferring the converted optical signal at the second node, the route reaching the third node from the first node via the second node; a determination unit configured to determine whether the route is reachable, based on a deterioration characteristic of an SN ratio in a wavelength converter configured to convert a wavelength of an optical signal from the first wavelength to the second wavelength at the second node; and a control unit configured to control the first node, the second node, and the third node in such a way as to perform communication using an optical signal in the route when the determination unit determines that the route is reachable.

In a second example aspect of the present disclosure, there is provided an information processing method including: specifying, based on a usage state of a wavelength at each of a first node, a second node, and a third node configured to perform communication using an optical signal, a route for converting a wavelength of an optical signal from a first wavelength to a second wavelength and transferring the converted optical signal at the second node, the route reaching the third node from the first node via the second node; determining whether the route is reachable, based on a deterioration characteristic of an SN ratio in a wavelength converter configured to convert a wavelength of an optical signal from the first wavelength to the second wavelength at the second node; and controlling, when determining that the route is reachable, the first node, the second node, and the third node in such a way as to perform communication using an optical signal in the route.

In a third example aspect of the present disclosure, there is provided a program causing a computer to execute processing of: specifying, based on a usage state of a wavelength at each of a first node, a second node, and a third node configured to perform communication using an optical signal, a route for converting a wavelength of an optical signal from a first wavelength to a second wavelength and transferring the converted optical signal at the second node, the route reaching the third node from the first node via the second node; determining whether the route is reachable, based on a deterioration characteristic of an SN ratio in a wavelength converter configured to convert a wavelength of an optical signal from the first wavelength to the second wavelength at the second node; and controlling, when determining that the route is reachable, the first node, the second node, and the third node in such a way as to perform communication using an optical signal in the route.

In a fourth example aspect of the present disclosure, there is provided an optical communication system including a first node, a second node, and a third node configured to perform communication using an optical signal, and an information processing apparatus, wherein the information processing apparatus includes: a specification unit configured to specify, based on a usage state of a wavelength at each of the first node, the second node, and the third node, a route for converting a wavelength of an optical signal from a first wavelength to a second wavelength and transferring the converted optical signal at the second node, the route reaching the third node from the first node via the second node; a determination unit configured to determine whether the route is reachable, based on a deterioration characteristic of an SN ratio in a wavelength converter configured to convert a wavelength of an optical signal from the first wavelength to the second wavelength at the second node; and a control unit configured to control the first node, the second node, and the third node in such a way as to perform communication using an optical signal in the route when the determination unit determines that the route is reachable.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 7 is a diagram illustrating an example of a configuration of a coherent transmission front-end unit according to the example embodiment;

FIG. 9 is a diagram illustrating an example of information recorded in a node DB (database) according to the example embodiment;

FIG. 10 is a diagram illustrating an example of information recorded in a deterioration characteristic DB according to the example embodiment;

EXAMPLE EMBODIMENT

Principles of the present disclosure are described with reference to several illustrative example embodiments. It is desired to be understood that these example embodiments are set forth for purposes of illustration only and that a person skilled in the art will assist in understanding and practicing the present disclosure without suggesting limitations on the scope of the present disclosure. The disclosure described herein may be implemented in a variety of ways other than those described below.

In the following description and claims, unless otherwise defined, all technical and scientific terms employed herein have the same meaning as commonly understood by a person skill in the art to which the present disclosure belongs.

Hereinafter, example embodiments of the present disclosure will be described with reference to the drawings.

First Example Embodiment

<Configuration>

Figure 1:
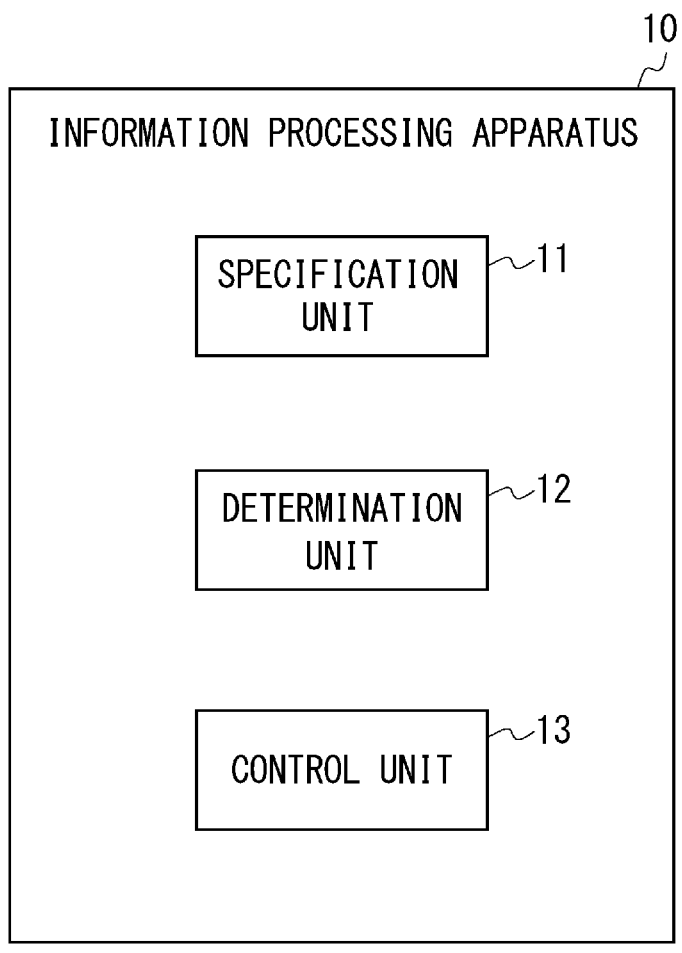
FIG. 1 is a diagram illustrating an example of a configuration of an information processing apparatus according to an example embodiment.

A configuration of an information processing apparatus 10 according to an example embodiment will be described with reference to FIG. 1. FIG. 1 is a diagram illustrating an example of a configuration of the information processing apparatus 10 according to the example embodiment. Note that the information processing apparatus 10 may also be referred to as, for example, a Network Management System (NMS) or the like. The information processing apparatus includes a specification unit 11, a determination unit 12, and a control unit 13.

The specification unit 11 specifies, based on a usage state of a wavelength at each of a first node (start point node), a second node (one or more relay nodes), and a third node (an end point node) that perform communication using an optical signal, a route for converting and transferring a wavelength of an optical signal at the second node, the route reaching the third node from the first node via the second node. In an optical communication system, a node serving as a start point of data transmission is also referred to as a start point node, a node for relaying data is referred to as a relay node, and a node serving as an end point of data transmission is also referred to as an end point node.

The determination unit 12 determines whether the route is reachable, based on a deterioration characteristic of a signal-to-noise ratio (SN ratio) at a wavelength converter in the second node. In a case where the determination unit 12 determines that the route is reachable, the control unit 13 controls the first node, the second node, and the third node in such a way as to perform communication using an optical signal in the route.

Second Example Embodiment

<System Configuration>

Figure 2:
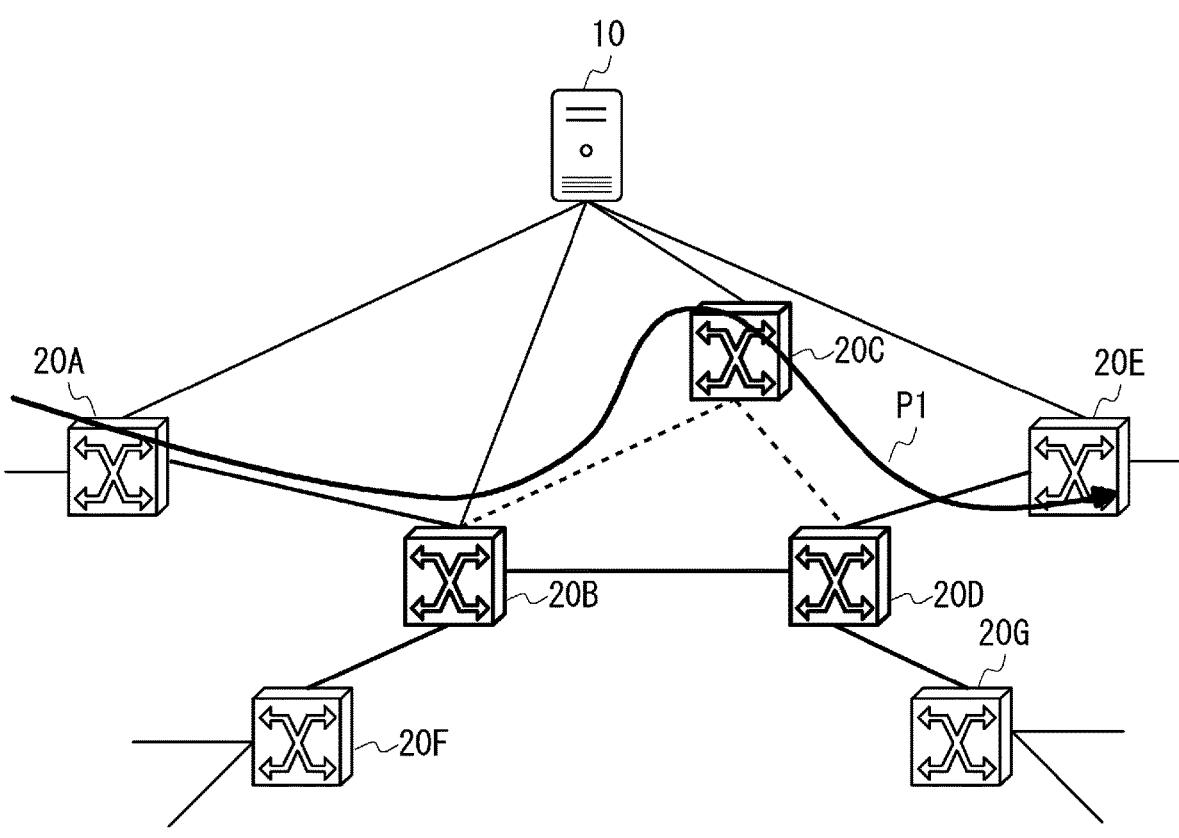
FIG. 2 is a diagram illustrating an example of a configuration of an optical communication system according to an example embodiment.

Next, a configuration of an optical communication system 1 according to an example embodiment will be described with reference to FIG. 2. The optical communication system 1 may be, for example, an all-photonics network using an Optical to Analog to Optical (O-A-O) wavelength conversion that converts a wavelength of an optical signal by analog signal processing without digital signal processing. FIG. 2 is a diagram illustrating an example of a configuration of the optical communication system 1 according to the example embodiment. In the example of FIG. 2, the optical communication system 1 includes an information processing apparatus 10. Further, the optical communication system 1 includes a node 20A, a node 20B, a node 20C, a node 20D, a node 20E, a node 20F, and a node 20G (hereinafter, simply referred to as a "node 20" when there is no need to distinguish them). Note that the information processing apparatuses 10 and the number of the nodes 20 are not limited to the example of FIG. 2.

The information processing apparatus 10 is connected to one or more nodes 20 via an optical transmission path (for example, an optical fiber). Each node 20 is connected to two or more other nodes 20 via an optical transmission path. A connection form (network topology) of the information processing apparatus 10 and the nodes 20 may be, for example, a mesh shape, a ring shape, or the like.

A route P1 illustrates an example of a route in which the node 20A is a start point node, the nodes 20B to 20D are relay nodes in the order of the nodes 20, and the node 20E is an end point node. Note that the start point node may be a computer or a switch apparatus, such as a server, having a circuit for converting an electric signal into an optical signal and transmitting the optical signal. The end point node may also be a computer or switch apparatus, such as a server, having a circuit for converting a received optical signal into an electric signal.

<Configuration of Node 20>

Figure 3:
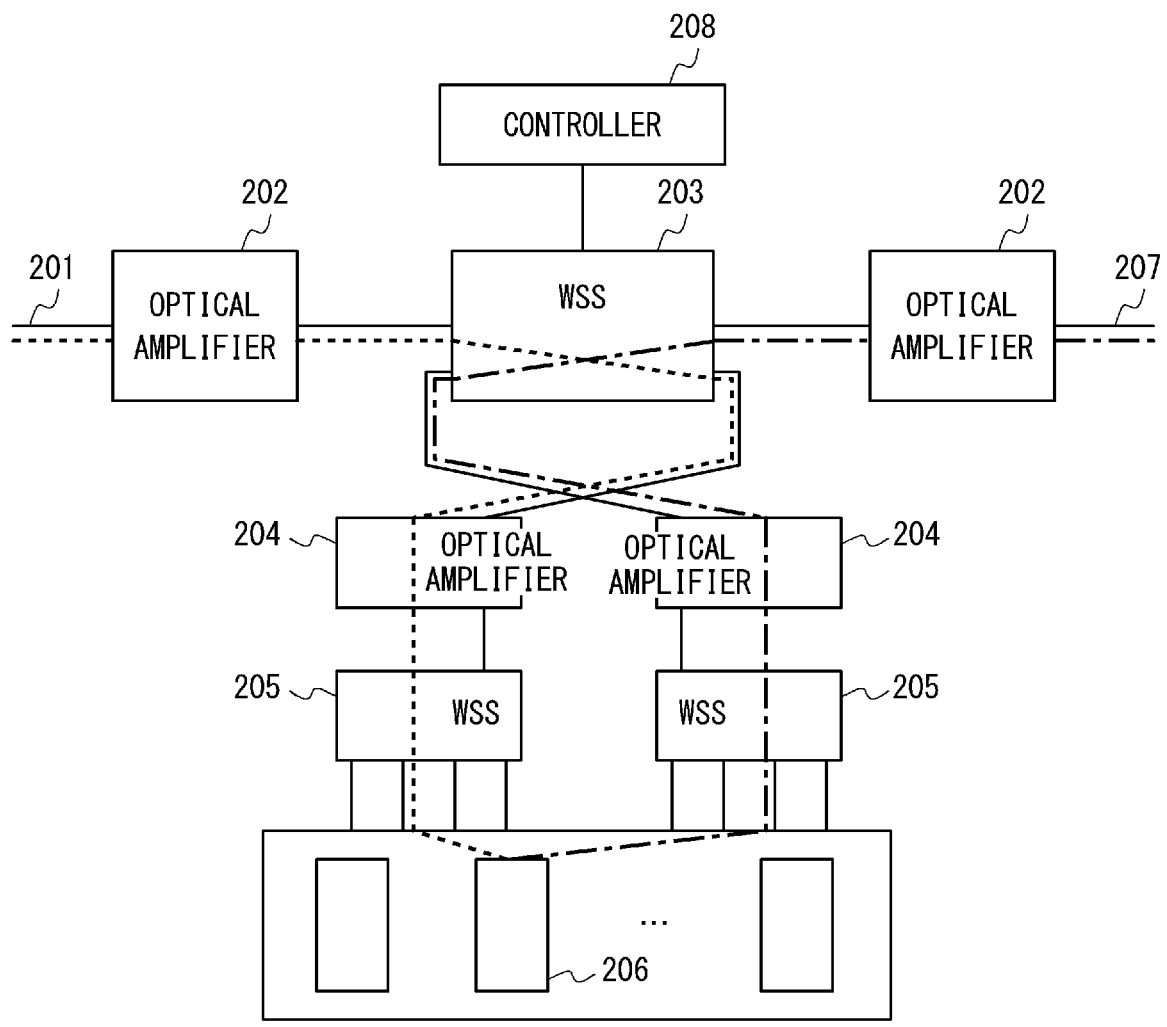
FIG. 3 is a diagram illustrating an example of a configuration of a node according to the example embodiment.

Next, a configuration of the node 20 according to the example embodiment will be described with reference to FIG. 3. FIG. 3 is a diagram illustrating an example of a configuration of the node 20 according to the example embodiment. In the example of FIG. 3, the node 20, which is a relay node, includes one or more optical fibers 201, an optical amplifier (optical amplifier, optical AMP) 202A, an optical amplifier 202B, an optical switch (WSS, Wavelength Selective Switch) 203, an optical amplifier 204A, an optical amplifier 204B, an optical switch 205A, an optical switch 205B, one or more wavelength converters 206, one or more optical fibers 207, and a controller 208.

The node 20 of the optical amplifier 202 compensates for transmission loss of the optical signal being input from the optical fiber 201 in a fiber unit. The optical switch 203 switches the optical signal from the optical amplifier 202 in a wavelength unit, and outputs the optical signal to, for example, the optical amplifier 204A.

The optical amplifier 204 compensates for loss of the optical signal from a wavelength conversion port of the optical switch 203 and outputs the compensated optical signal to the optical switch 205A. The optical switch 205A separates the optical signal of the fiber unit from the optical amplifier 204A into wavelength units, and outputs the separated optical signal to the wavelength converter 206.

The wavelength converter 206 converts an optical signal of a first wavelength from the optical switch 205A into an electric signal, performs analog signal processing, such as analog compensation, on the electric signal, converts the signal into an optical signal of a second wavelength, and outputs the optical signal to the optical switch 205B. The wavelength converter 206 once converts an optical signal into an electric signal, but performs only analog signal processing, converts the optical signal into an optical signal of another wavelength again, and relays the optical signal. Physically, an analog delay of the electric circuit occurs, but it is at most a few nsec or less, which is negligibly small. Therefore, it is possible to achieve a wavelength conversion function with low latency in a unit of channels as compared with a case where wavelength conversion is performed by digital signal processing.

Herein, the wavelength converter 206 may perform, for example, band compensation, PDL compensation (polarization dependent loss compensation), dispersion compensation, and the like as analog compensation. Since the same wavelength cannot be used in the optical fiber, optical signals having different routes at the same wavelength that arrive at the node 20 cannot be accommodated in the same optical fiber. Therefore, the node 20 converts the wavelength of the optical signal in a certain route from the first wavelength to the second wavelength by using the wavelength converter 206, and therefore, the optical signal in the route, which is converted to the second wavelength, and the optical signal of the first wavelength in another route can be accommodated in the same optical fiber.

The optical switch 205B bundles the optical signals of the wavelength unit from the wavelength converter 206 into fiber units, and outputs the bundled optical signals to the optical amplifier 204B.

The optical amplifier 204B compensates for the loss of the optical signal from the optical switch 205B and outputs the compensated optical signal to the optical switch 203. The optical switch 203 receives an optical signal of the fiber unit from the optical amplifier 204B, performs switching in a wavelength unit, and outputs the optical signal to the optical amplifier 202B. The optical amplifier 202B compensates for the transmission loss of the optical signal from the optical switch 203 in a fiber unit, and outputs the compensated signal to the optical fiber 207. The optical fiber 207 outputs the optical signal of the fiber unit from the optical amplifier 202B to another node 20. The controller 208 controls each device (e.g., the optical switch 203) within the node 20.

<<Configuration of Wavelength Converter 206>>

Figure 4:
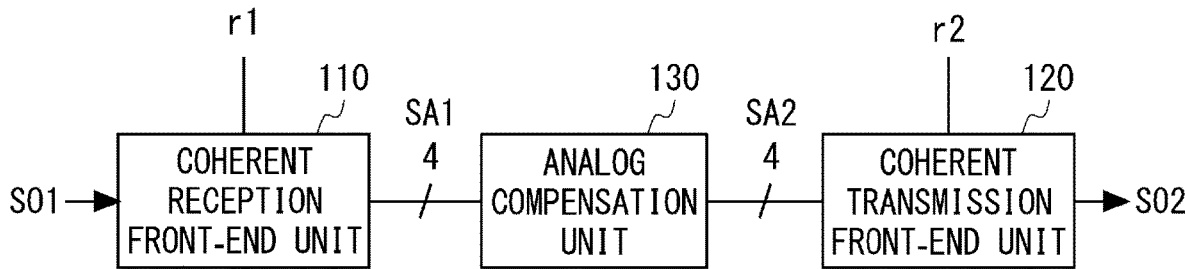
FIG. 4 is a diagram illustrating an example of a configuration of a wavelength converter according to the example embodiment.
Figure 5:
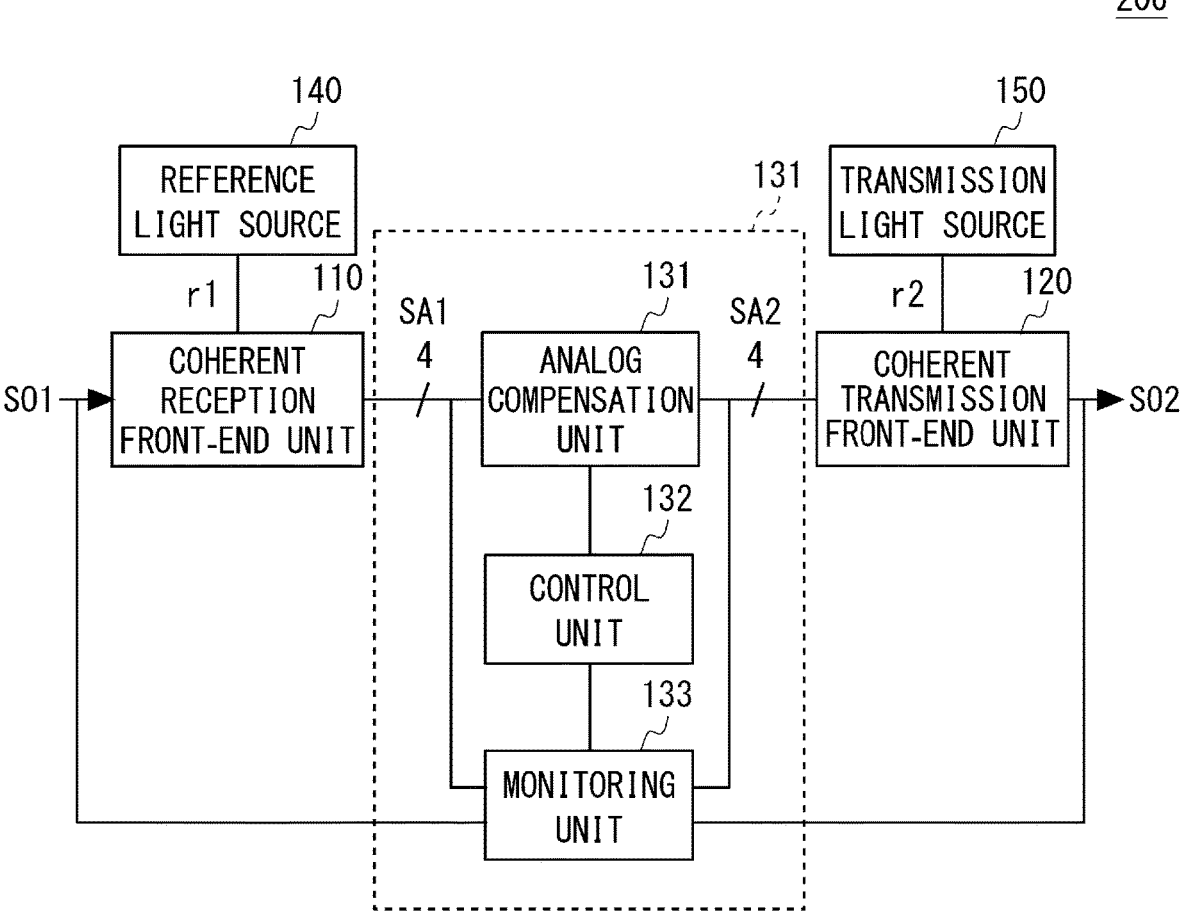
FIG. 5 is a diagram illustrating a more detailed example of the configuration of the wavelength converter according to the example embodiment.
Figure 6:
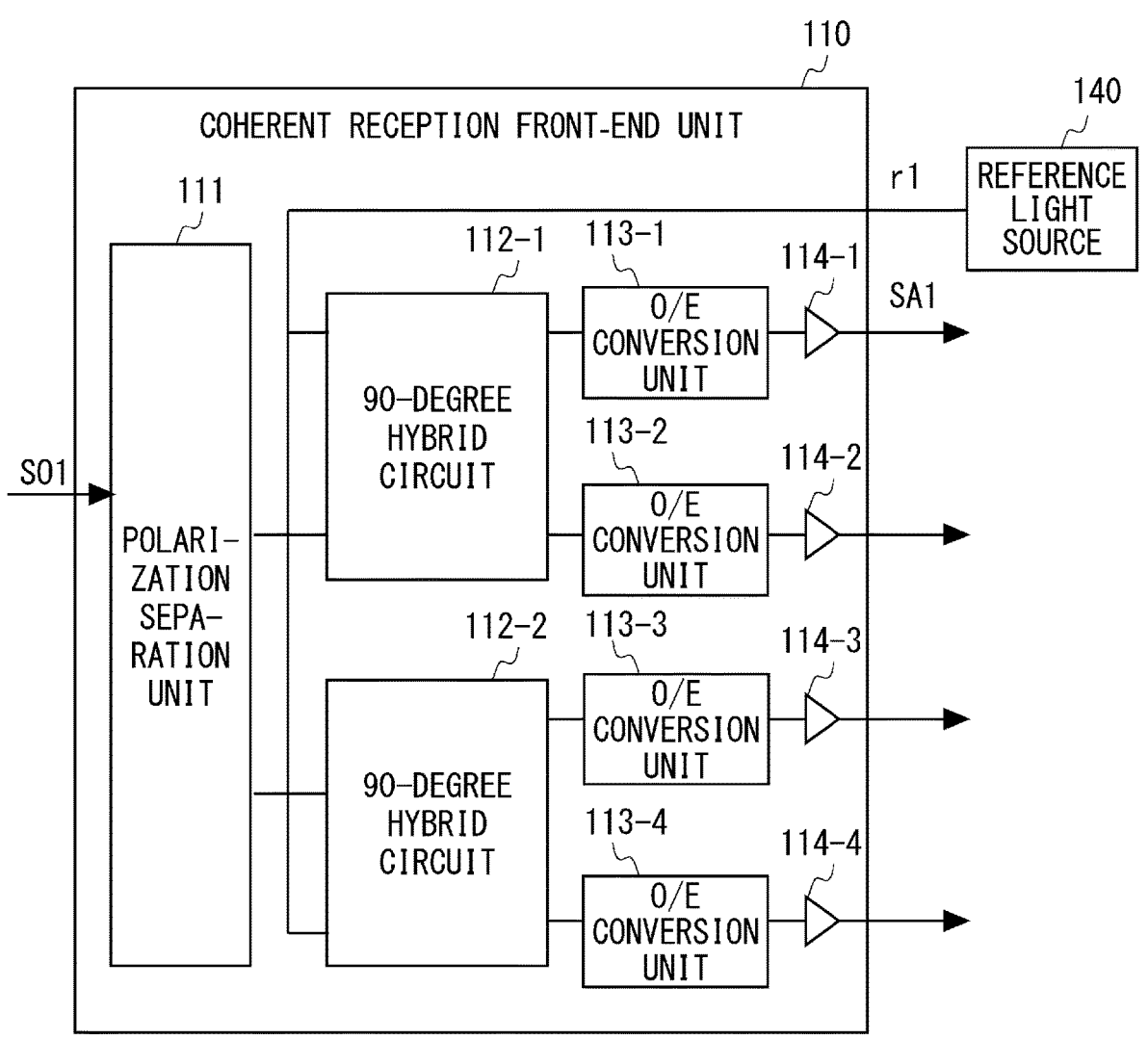
FIG. 6 is a diagram illustrating an example of a configuration of a coherent reception front-end unit according to the example embodiment.

Next, a configuration of the wavelength converter 206 according to the example embodiment will be described with reference to FIGS. 4 to 7. FIG. 4 is a diagram illustrating an example of a configuration of the wavelength converter 206 according to the example embodiment. FIG. 5 is a diagram illustrating a more detailed example of the configuration of the wavelength converter 206 according to the example embodiment. FIG. 6 is a diagram illustrating an example of a configuration of a coherent reception front-end unit 110 according to the example embodiment. FIG. 7 is a diagram illustrating an example of a configuration of a coherent transmission front-end unit 120 according to the example embodiment.

In the example of FIG. 4, the wavelength converter 206 includes the coherent reception front-end unit 110, the coherent transmission front-end unit 120, and an analog compensation unit 130.

The coherent reception front-end unit 110 converts an optical signal into an electric signal and performs coherent detection. The coherent reception front-end unit 110 coherently detects an input optical signal SO1 to be input, based on a local oscillation light r1, and outputs a generated analog electric signal SA1.

The coherent transmission front-end unit 120 converts an electric signal into an optical signal and performs coherent modulation. The coherent transmission front-end unit 120 performs coherent modulation on an analog electric signal SA2 acquired by turning around the analog electric signal SA1, based on a transmission light r2, and outputs a generated output optical signal SO2.

The input optical signal SO1 and the output optical signal SO2 are phase-modulated and polarization-multiplexed optical signals. The analog electric signals SA1 and SA2 are four lanes (4 ch) of signals including an XI signal having an I component (in-phase component) of an X polarization, an XQ signal having a Q component (quadrature component) of the X polarization, a YI signal having an I component of a Y polarization, and a YQ signal having a Q component of the Y polarization.

A frequency of the local oscillation light r1 is a frequency (carrier frequency) of the input optical signal SO1 to be received, and a frequency of the transmission light r2 is a frequency of the output optical signal SO2 to be transmitted. For example, the local oscillation light r1 and the transmission light r2 have different frequencies, but may have the same frequency. By changing the frequencies of the local oscillation light r1 and the transmission light r2, the wavelength of the optical signal to be turned around can be switched. Namely, the input optical signal SO1 can be converted into an output optical signal SO2 having a different wavelength.

The analog compensation unit 130 is a circuit that performs predetermined analog signal processing on the analog electric signal SA1 between the coherent reception front-end unit 110 and the coherent transmission front-end unit 120 and generates the analog electric signal SA2. The analog compensation unit 130 performs analog signal processing on the analog electric signal SA1 in such a way as to compensate for signal quality according to signal characteristics from an input of the coherent reception front-end unit 110 to an output of the coherent transmission front-end unit 120, and generates the analog electric signal SA2.

Note that one or both of the optical signal and the analog electric signal may be simply referred to as a "signal". The compensation of the signal quality in the present disclosure includes compensation for deterioration of the optical signal that occurs each time it passes through the node 20, and compensation for deterioration of the analog electric signal that occurs within the node 20. For example, the deterioration of the optical signal to be compensated includes band deterioration (PBN: Pass Band Narrowing) that occurs when passing through an optical multiplexer/demultiplexer, an optical filter, and the like of each node 20, amplitude variation of four lanes due to variations in O/E or E/O conversion efficiency, optical frequency offset, and the like. The deterioration of the analog electric signal to be compensated includes band deterioration due to characteristic deterioration and characteristic variation of an analog electric circuit of the four lanes, amplitude variation of the four lanes, skew of the four lanes, and the like. In other words, the compensation of the signal quality includes band compensation for compensating for the band deterioration of the signal, frequency offset compensation for compensating for a deviation of the frequency of the local oscillation light, skew compensation for compensating for a variation in a timing of each signal component included in the signal, amplitude compensation for compensating for a variation in the amplitude of each signal component included in the signal, and the like.

As illustrated in FIG. 5, the analog compensation unit 130 may include an analog signal processing unit 131, a control unit 132, and a monitoring unit 133. Further, the wavelength converter 206 may include a reference light source 140 that generates the local oscillation light r1 and a transmission light source 150 that generates the transmission light r2. The reference light source 140 may be inside the coherent reception front-end unit 110, and the transmission light source 150 may be inside the coherent transmission front-end unit 120.

The analog signal processing unit 131 is an analog circuit that performs predetermined analog signal processing for compensating for signal quality. The analog signal processing unit 131 processes the analog electric signal SA1 as an analog signal and outputs the analog electric signal SA2. The analog signal processing unit 131 performs only analog signal processing, and does not perform digital signal processing in which a large delay occurs. Thus, physical delays can be suppressed to, for example, several nsec or less.

The monitoring unit 133 monitors signal characteristics of any one of the input optical signal SO1, the analog electric signal SA1, the analog electric signal SA2, and the output optical signal SO2 between the input of the coherent reception front-end unit 110 and the output of the coherent transmission front-end unit 120. The signal characteristics to be monitored are, for example, a characteristic of a polarization signal (polarization-multiplexed X polarization and Y polarization) included in an optical signal, a characteristic of a complex signal (phase-modulated I component and Q component) included in an analog electric signal, and the like.

The control unit 132 controls an operation of the analog signal processing of the analog signal processing unit 131, based on a monitoring result of the monitoring unit 133. By optimizing the analog signal processing according to the monitored signal characteristics, band compensation, skew compensation, and the like are performed, and deterioration of signal quality is suppressed. Since signal processing speeds of the control unit 132 and the monitoring unit 133 do not affect latency of a main signal, time constants of the control unit 132 and the monitoring unit 133 may be low. The control unit 132 and the monitoring unit 133 may be analog circuits or digital circuits.

As illustrated in FIG. 6, the coherent reception front-end unit 110 includes polarization separation units 111, 90-degree hybrid circuits 112-1 to 112-2, O/E conversion units 113-1 to 113-4, and amplifiers 114-1 to 114-4.

The polarization separation unit 111 polarization-separates the input optical signal 501, which is an input polarization combining signal, into X polarization and Y polarization. The 90-degree hybrid circuits (coherent optical detectors) 112-1 to 112-2 perform coherent detection by causing the optical signal polarization-separated by the polarization separation unit 111 and the local oscillation light r1 of the reference light source 140 to interfere with each other, and convert the signals detected by the O/E converters 113-1 to 113-4 composed of Photo Diode or the like into analog electric signals of four lanes. The 90-degree hybrid circuit 112-1 separates the X polarization of the input optical signal SO1 into an I component and a Q component, and then performs photoelectric conversion by the O/E conversion units 113-1 to 113-2, and thereby generates an XI signal and an XQ signal. The 90-degree hybrid circuit 112-2 separates the Y polarization of the input optical signal SO1 into an I component and a Q component, and then performs photoelectric conversion by the O/E conversion units 113-3 to 113-4, and thereby generates a YI signal and a YQ signal. The amplifiers 114-1 to 114-4 amplify the generated XI signal, XQ signal, YI signal, and YQ signal, respectively, and output the amplified XI signal, XQ signal, YI signal, and YQ signal to the analog compensation unit 130 as the analog electric signals SA1 of four lanes. The analog compensation unit 130 performs analog signal processing on all or a part of the XI signal, the XQ signal, the YI signal, and the YQ signal (X polarization or Y polarization).

As illustrated in FIG. 7, the coherent transmission front-end unit 120 includes amplifiers 121-1 to 121-4, MZ modulators (MZM: Mach-Zehnder Modulator) 122-1 to 122-4, and a polarization combining unit 123.

The amplifiers 121-1 to 121-4 amplify the XI signal, the XQ signal, the YI signal, and the YQ signal of the analog electric signal SA2 being output from the analog compensation unit 130, respectively, and drive the MZ modulators 122-1 to 122-4. The MZ modulators (IQ optical modulators)

122-1 to 122-4 apply IQ modulation to the transmission light r2 of the transmission light source 150 according to the XI signal, the XQ signal, the YI signal, and the YQ signal applied thereto, respectively. The MZ modulators 122-1 to 122-2 generate an IQ modulated optical signal of X polarization, based on the XI signal and the XQ signal via the amplifiers 121-1 to 121-2. The MZ modulators 122-3 to 122-4 generate an IQ modulated optical signal of Y polarization, based on the YI signal and the YQ signal via the amplifiers 121-3 to 121-4. The polarization combining unit 123 performs polarization combining of the generated IQ modulated optical signal of the X polarization and the IQ modulated optical signal of the Y polarization, and outputs the combined optical signal as the output optical signal SO2.

<Processing>

Figure 8:
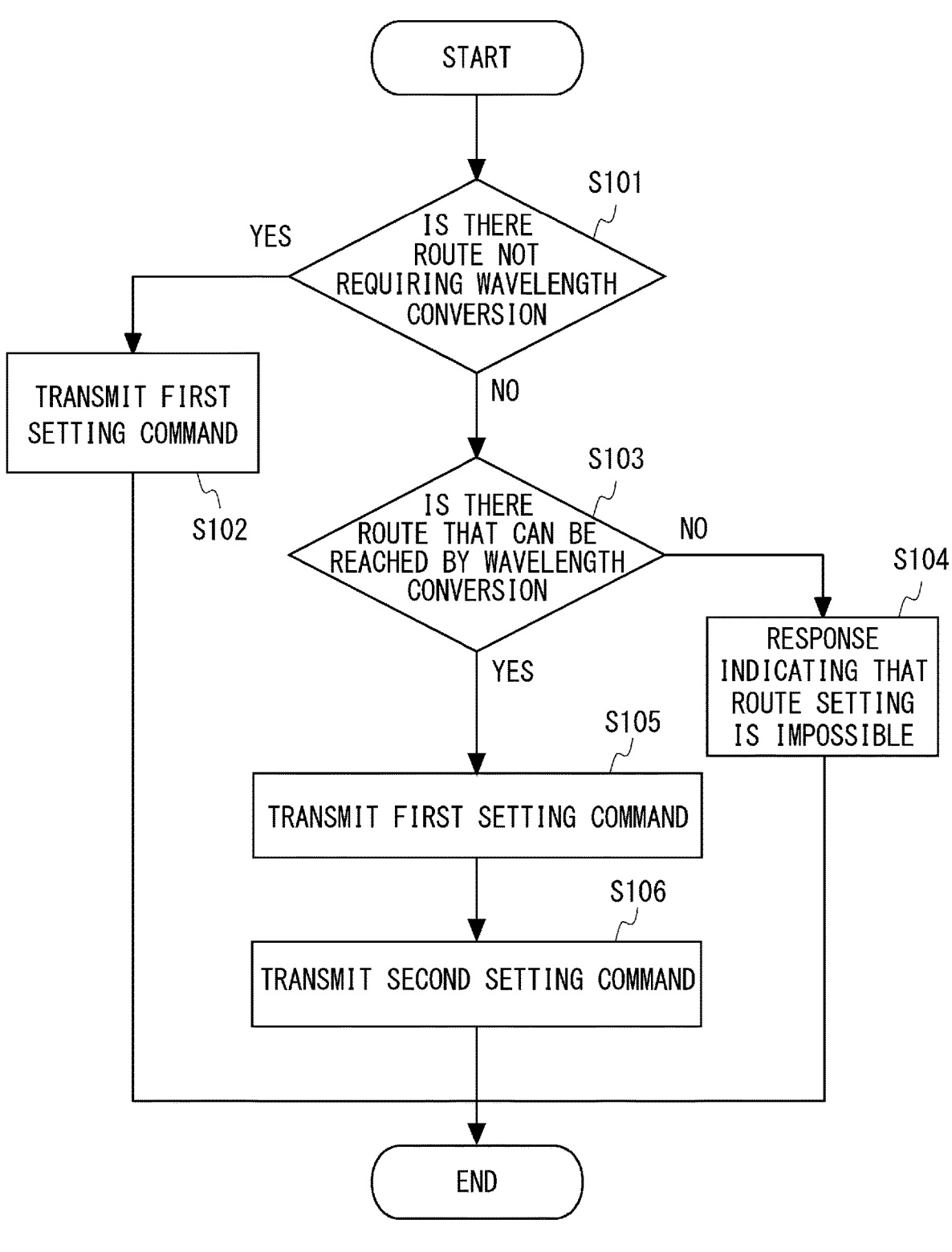
FIG. 8 is a flowchart illustrating an example of processing performed by the information processing apparatus according to the example embodiment.
Figure 11:
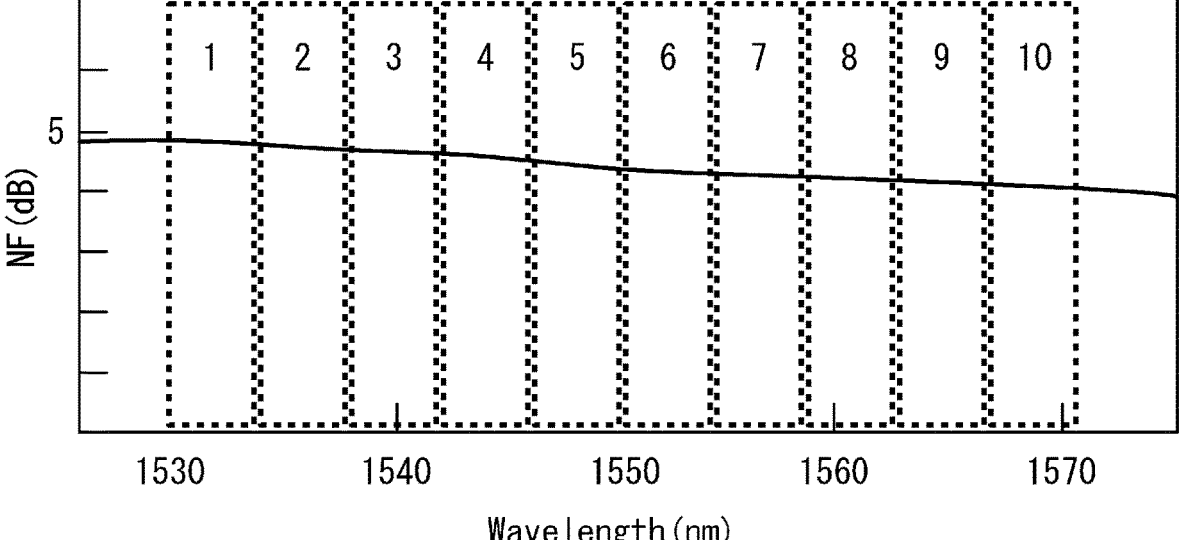
FIG. 11 is a diagram illustrating an example of Noise Figure (NF) of an optical amplifier of a node according to the example embodiment.

Next, an example of processing of the information processing apparatus 10 according to the example embodiment will be described with reference to FIGS. 8 to 11. FIG. 8 is a flowchart illustrating an example of processing performed by the information processing apparatus 10 according to the example embodiment. FIG. 9 is a diagram illustrating an example of information recorded in a node DB (database) 901 according to the example embodiment. FIG. 10 is a diagram illustrating an example of information recorded in a deterioration characteristic DB 1001 according to the example embodiment. FIG. 11 is a diagram illustrating an example of Noise Figure (NF) of an optical amplifier of the node 20 according to the example embodiment.

For example, the information processing apparatus 10 may execute the processing of FIG. 8 when receiving a setting request of a route (route setting request, path request). The path request may include identification information of the start point node 20 and identification information of the end point node 20. The path request may be transmitted from the start point node 20, for example. Further, the path request may be issued (transmitted) from a communication apparatus that starts data communication using the node 20, for example. In this case, the communication apparatus may be an optical media converter or the like that converts the received electric signal into an optical signal and relays the optical signal.

In step S101, the specification unit 11 determines, based on the path request and the information recorded in the node DB 901, whether there is a wavelength and a route (hereinafter, also referred to as a "first route" as appropriate) that match a condition that can be communicated by any of the relay nodes 20 in the route without performing wavelength conversion.

Herein, the specification unit 11 may specify, as the first route, for example, a shortest route or the like in which transmission delay from the start point node 20 to the end point node 20 through the one or more nodes 20 is minimized. In this case, the specification unit 11 may specify, for example, a route having a minimum number of hops (for example, the number of the relay nodes 20 in the route) in which the wavelength is not being used (there is no wavelength collision) at the relay node 20 among the routes from the start point node 20 to the end point node 20 through the one or more nodes 20. Note that, for example, the specification unit 11 may not specify a route in which the number of hops is equal to or greater than a threshold value. In addition, for example, the specification unit 11 may not specify a route in which a communication speed in the route is equal to or lower than the threshold value.

In the example of FIG. 9, in the node DB 901, a usage state and a communication speed are recorded in association with a combination of a transmission source node ID, a transmission destination node ID, and a wavelength ID. The transmission source node ID is identification information of the node 20 being a transmission source. The transmission destination node ID is a node ID of another node 20 (transmission destination node 20) in which a certain node 20 (transmission source node 20) can transmit an optical signal. The usage state may be information indicating whether communication at each wavelength is currently used (employed) in a communication from the transmission source node 20 to the transmission destination node 20. The communication speed may be information indicating a communication speed (communication band) at each wavelength from the transmission source node 20 to the transmission destination node 20.

The node ID, the transmission destination node ID, the wavelength ID, and the communication speed may be set in advance by an administrator of the information processing apparatus 10 or the like. The usage state may be set (updated) by the information processing apparatus 10. Note that the node DB 901 may be recorded in a storage device inside the information processing apparatus 10 or may be recorded in a storage device outside the information processing apparatus 10.

When there is a first route (YES in step S101), the control unit 13 transmits a first setting command for each node 20 to each node 20 on the first route (step S102). Herein, the first setting command for each node 20 may include information indicating the wavelength of the optical signal to be transferred by the node 20 that has received the first setting command, and the node ID of the transmission destination node 20. Then, the node 20 that has received the first setting command sets the optical switch 203 or the like in such a way as to transfer (relay) the optical signal of the wavelength designated by the first setting command to the designated transmission destination node 20. Thus, for example, in the optical communication system 1, data can be transferred from the start point node 20 to the end point node 20.

Meanwhile, when there is no first route (NO in step S101), the specification unit 11 and the determination unit 12 determine whether there is a route (hereinafter, also referred to as a "second route" as appropriate) that matches a condition that can be reached by performing wavelength conversion at one or more relay nodes 20 in the route, based on the path request and the information recorded in the node DB 901 (step S103).

Herein, the specification unit 11 may specify a route which is a candidate of the second route, and the determination unit 12 may determine whether the one or more routes specified by the specification unit 11 are reachable. Then, the specification unit 11 may specify, as the second route, the route determined to be reachable by the determination unit 12 among the candidates of the second route.

In this case, in a case where transmission is performed at the first wavelength to the transmission destination node 20 (the next relay node 20 or the end node 20) at a certain relay node 20 (the first wavelength is being used), the specification unit 11 may first specify, for example, a route for converting the wavelength to the second wavelength at the relay node 20, among the routes from the start point node 20 to the end point node 20 through the one or more nodes 20. Note that, for example, the specification unit 11 may not specify a route whose number of hops is equal to or greater than a threshold value as a candidate for the second route. Further, for example, the specification unit 11 may not specify a route in which the communication speed in the route is equal to or lower than a threshold value as a candidate of the second route.

Then, for each route included in the candidate of the second route, the determination unit 12 may determine whether it is possible to reach the end point node 20 in the route, based on at least one of a deterioration characteristic of a SN ratio in the wavelength converter 206 of one or more nodes 20 that perform wavelength conversion in the route, a deterioration characteristic of a SN ratio in the optical amplifier of each node 20 in the route, and a deterioration characteristic (deterioration degree) of the SN ratio due to a link length of the route.

In this case, the determination unit 12 may refer to the deterioration characteristic DB 1001 illustrated in FIG. 10 and acquire the deterioration characteristic of the SN ratio in the wavelength converter 206 of one or more nodes 20 that perform wavelength conversion in the route and the deterioration characteristic of the SN ratio in each optical amplifier of each node 20 in the route. In the example of FIG. 10, the deterioration characteristic DB 1001 records the deterioration characteristic of the SN ratio in the wavelength converter 206 and the deterioration characteristic of the SN ratio in the optical amplifier in association with a combination of a node ID, an input wavelength ID, and an output wavelength ID. Note that a case where the input wavelength ID and the output wavelength ID are the same indicates a case where the wavelength conversion is not performed.

The input wavelength ID is the wavelength ID of the wavelength of the optical signal being input to the node 20 in the route. The output wavelength ID is the wavelength ID of the wavelength of the optical signal being output from the node 20 in the route. The deterioration characteristic of the SN ratio in the wavelength converter 206 is an index indicating a degree of deterioration of the SN ratio of the optical signal by the wavelength converter 206 when the wavelength converter 206 converts the input wavelength to the output wavelength. The deterioration characteristic of the SN ratio in the optical amplifier is an index indicating a degree of deterioration of the SN ratio of the optical signal by each optical amplifier of the node 20.

The information of the deterioration characteristic DB 1001 may be set in advance by an administrator or the like of the information processing apparatus 10. In this case, values of the deterioration characteristic of the SN ratio in the wavelength converter 206 and the deterioration characteristic of the SN ratio in the optical amplifier may be a value determined by the administrator or the like, based on an actual measurement value, a design value, or the like. The deterioration characteristic DB 1001 may be recorded in a storage device inside the information processing apparatus 10 or may be recorded in a storage device outside the information processing apparatus 10.

Further, the determination unit 12 may determine the link length of the route, based on, for example, at least one of the number of hops of the route and a total value of lengths of the optical fiber cables of the route. Then, the determination unit 12 may estimate the deterioration characteristic of the SN ratio due to the link length of the route. In this case, the determination unit 12 may calculate a value (estimated value) of the degradation characteristic of the SN ratio due to the link length of the route by multiplying the value of a coefficient determined by the administrator or the like, based on the actual measurement value, the design value, or the like by a value of the link length of the route, for example.

When the value acquired by multiplying the value of the deterioration characteristic of the SN ratio in the wavelength converter 206 of one or more nodes 20 that perform the wavelength conversion in the route, the value of the deterioration characteristic of the SN ratio in each optical amplifier of each node 20 in the route, and the value of the deterioration characteristic of the SN ratio due to the link length of the route is equal to or less than the threshold value, the determination unit 12 may determine that it is not possible to reach the end point node 20 in the route. Thus, for example, even in a system in which the SN ratio or the like of the transmission signal is deteriorated by wavelength conversion using the wavelength converter 206, it is possible to further guarantee the arrival in the route.

When there is no second route (NO in step S103), the control unit 13 transmits (returns) a response indicating that the route setting is impossible to the path request (step S104), and ends the processing. By contrast, when there is a second route (YES in step S103), the control unit 13 transmits a first setting command for each node 20 to each node that does not perform wavelength conversion among the nodes 20 in the second route (step S105). Note that the processing of step S105 may be the same as the processing of step S102.

Subsequently, the control unit 13 transmits a second setting command for each node 20 to a node that performs wavelength conversion among the nodes 20 in the second route (step S106). Herein, the second setting command for each node 20 may include information indicating the wavelength of the received optical signal by the node 20 that has received the second setting command, information indicating the wavelength of the optical signal converted and transferred by the node 20, and the node ID of the transmission destination node 20. Then, the node 20 that has received the second setting command converts the optical signal of the first wavelength designated by the second setting command into the optical signal of the designated second wavelength, and sets the optical switch 203, the optical switch 205A, the wavelength converter 206, and the like in such a way as to transfer (relay) the optical signal to the designated transmission destination node 20. Thus, for example, in the optical communication system 1, data can be transferred from the start point node 20 to the end point node 20.

(Example of Determining Presence or Absence of Wavelength Conversion on Route According to Priority of Communication)

The specification unit 11 may determine presence or absence of wavelength conversion on a route according to priority of communication. As a result, for example, it is possible to set (assign) a route having a relatively low deterioration in the SN ratio due to the conversion of the wavelength on the route for communication having a relatively high priority.

In this case, the specification unit 11 may determine the priority for each of a plurality of path requests received within a specific period (for example, one minute). In addition, the specification unit 11 may determine the priority for each path request for each route that has already been set and is currently used, and each path request that has been received within the specified period and for which a route has not been set.

In this case, the specification unit 11 may first specify the priority of the path request, based on at least one of the communication speed requested in the received path request and a degree of importance specified in the path request. Herein, for example, the specification unit 11 may determine a priority higher as the communication speed requested by a user, an application that performs communication, or the like is higher. In addition, the specification unit 11 may determine the priority higher as the degree of importance designated by a user, an application that performs communication, or the like is higher, for example.

Then, the specification unit 11 may specify, in response to a path request of a first priority, a first route through which the optical signal having a wavelength as the first wavelength is transferred at the second node, based on the first priority. In addition, the specification unit 11 may specify a route for converting the wavelength of the optical signal from the first wavelength to the second wavelength and transferring the converted optical signal at the second node, based on the second priority in response to the path request having the second priority lower than the first priority. In this case, for example, the specification unit 11 may execute the processing of FIG. 8 in descending order of priority in response to each path request. As a result, it is possible to preferentially assign the first route that does not perform the wavelength conversion to any relay node 20 in the route, in response to the path request having a relatively high priority. (Example of Determining Wavelength after Conversion on Route According to Priority of Communication)

The specification unit 11 may determine a wavelength after conversion on a route according to a priority of the communication. As a result, for example, it is possible to set (assign) a route at a wavelength in which deterioration of the SN ratio due to conversion of the wavelength on the route is relatively small for communication having a relatively high priority.

As illustrated in FIG. 11, an NF of the optical amplifier or the like of the node 20 deteriorates in deterioration characteristics as the wavelength becomes shorter. For this reason, for example, in the case of converting to a relatively short wavelength, the deterioration characteristics deteriorate as compared with the case of converting to a relatively long wavelength.

In this case, the specification unit 11 may first specify the priority of the path request, based on at least one of the communication speed requested in the received path request and the degree of importance designated in the path request, as in the above-described example.

In response to a path request of a third priority, the specification unit 11 may specify a route for converting the wavelength of the optical signal from the first wavelength to the second wavelength and transferring the converted optical signal at the second node, based on the third priority. In addition, in response to a path request having a fourth priority lower than the third priority, a route for converting the wavelength of the optical signal from the first wavelength to a third wavelength shorter than the second wavelength and transferring the converted optical signal at the second node, based on the fourth priority may be specified. In this case, for example, the specification unit 11 may execute the processing of FIG. 8 in descending order of priority in response to each path request. Then, in the processing of step S103 in FIG. 8, the specification unit 11 may divide the wavelength band of the node 20 that converts the wavelength on the route into a specific number (for example, ten as illustrated in FIG. 11) and set (assign) a route in a wavelength band of a relatively long wavelength among the available wavelength bands in descending order of priority. As a result, it is possible to preferentially assign a second route that is converted to a wavelength at which the deterioration of the SN ratio is relatively reduced in the relay node in the route to the path request having a relatively high priority.

<Hardware Configuration>

Figure 12:
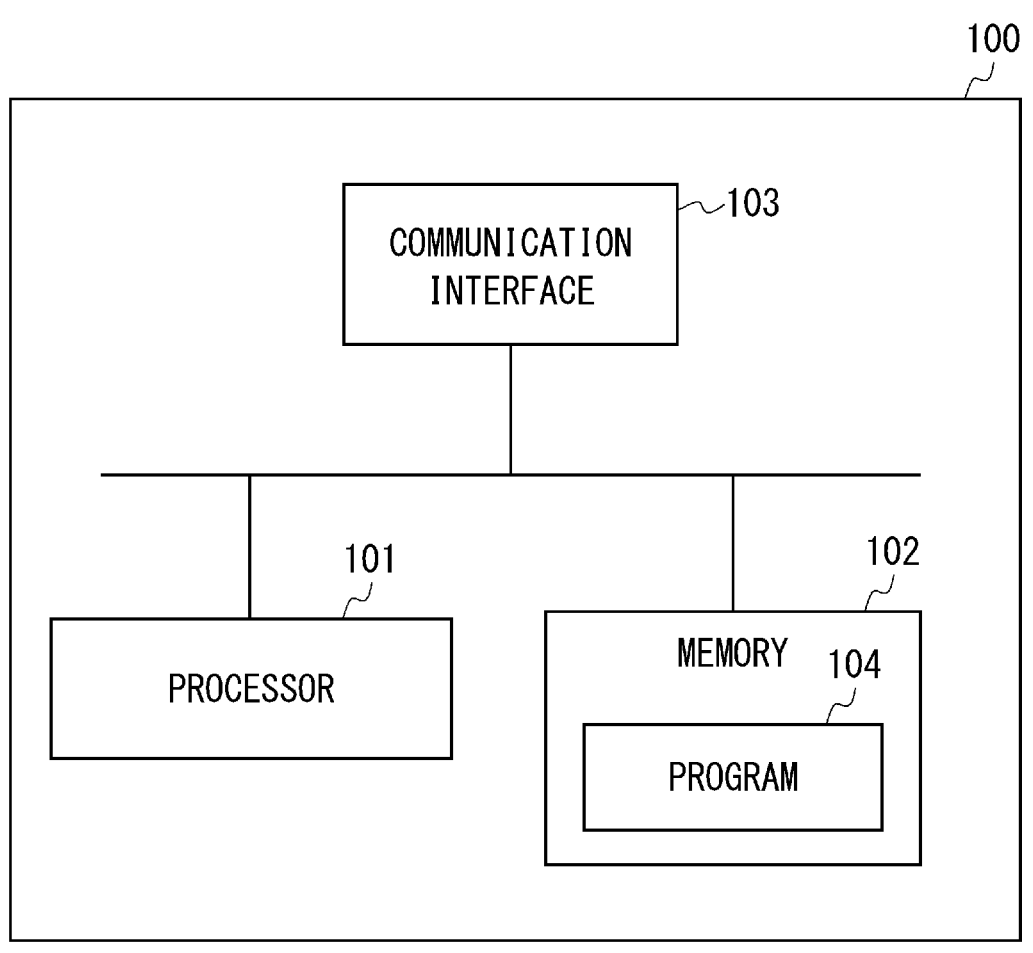
FIG. 12 is a diagram illustrating an example of a hardware configuration of an information processing apparatus according to the example embodiment.

FIG. 12 is a diagram illustrating an example of a hardware configuration of the information processing apparatus 10 according to the example embodiment. In the example of FIG. 12, the information processing apparatus 10 (computer 100) includes a processor 101, a memory 102, and a communication interface 103. These units may be connected by a bus or the like. The memory 102 stores at least a part of a program 104. The communication interface 103 includes an interface necessary for communication with other network elements.

When the program 104 is executed by the cooperation of the processor 101, the memory 102, and the like, the computer 100 performs at least a part of the processing according to the example embodiments of the present disclosure. The memory 102 may be of any type suitable for a local technology network. The memory 102 may be, as a non-limiting example, a non-transitory computer-readable storage medium. The memory 102 may also be implemented by employing any suitable data storage technology, such as a semiconductor-based memory device, a magnetic memory device and system, an optical memory device and system, fixed memory, and removable memory. Although only one memory 102 is illustrated in the computer 100, there may be several physically different memory modules in the computer 100. The processor 101 may be of any type. The processor 101 may include one or more of a general purpose computer, a special purpose computer, a microprocessor, a digital-signal processor (DSP: Digital Signal Processor), and, as non-limiting examples, a processor based on a multi-core processor architecture. The computer 100 may include a plurality of processors, such as integrated circuit chips for specific application, which are temporally dependent on a clock that synchronizes a main processor.

The example embodiments of the present disclosure may be implemented in hardware or dedicated circuit, software, logic, or any combination thereof. Some aspects may be implemented in hardware, while other aspects may be implemented in firmware or software that can be executed by a controller, microprocessor, or other computing device.

The present disclosure also provides at least one computer program product tangibly stored on a non-transitory computer readable storage medium. The computer program product includes computer-executable instructions, such as instructions contained in a program module, which is executed on a device on a real processor or virtual processor of interest, and executes the processes or methods of the present disclosure. The program module includes a routine, a program, a library, an object, a class, a component, a data structure, and the like that perform a particular task or implement a particular abstract data type. A function of the program module may be combined or divided between the program modules as desired in various example embodiments. A machine-executable instruction of the program module may be executed in a local or distributed device. In the distributed device, the program module can be located on both local and remote storage media.

Program codes for executing the method of the present disclosure may be written in any combination of one or more programming languages. These program codes are provided to a processor or controller of a general purpose computer, special purpose computer, or other programmable data processing apparatus. When the program code is executed by a processor or controller, functions/operations in the flowcharts and/or implementing block diagrams are executed. The program code is executed entirely on the machine, partly on the machine, as a stand-alone software package, partly on the machine, partly on a remote machine, or entirely on the remote machine or a server.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

<Modification>

The information processing apparatus 10 may be an apparatus included in one housing, but the information processing apparatus 10 of the present disclosure is not limited to this. The information processing apparatus 10 may be achieved by, for example, cloud computing constituted by one or more computers. Further, the information processing apparatus 10 and the node 20 may be configured as an integrated apparatus. Further, the node 20 may execute at least a part of the processing of each functional unit of the information processing apparatus 10. Such an information processing apparatus 10 is also included in an example of the "information processing apparatus" of the present disclosure.

Each of the above-described embodiments can be combined as desirable by one of ordinary skill in the art.

An example advantage according to the above-described embodiments is that reachability of the route can be improved in an optical communication system that converts a wavelength of an optical signal at a relay node in a route.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

Some or all of the above-described example embodiments may be described as the following supplementary notes, but are not limited thereto.

(Supplementary Note 1)

An information processing apparatus including:

a specification unit configured to specify, based on a usage state of a wavelength at each of a first node, a second node, and a third node that perform communication using an optical signal, a route reaching the third node from the first node via the second node and for converting a wavelength of an optical signal from a first wavelength to a second wavelength at the second node;

a determination unit configured to determine whether the route is reachable, based on a deterioration characteristic of an SN ratio in a wavelength converter configured to convert a wavelength of an optical signal from the first wavelength to the second wavelength at the second node; and a control unit configured to control the first node, the second node, and the third node in such a way as to perform communication using an optical signal in the route when the determination unit determines that the route is reachable.

(Supplementary Note 2)

The information processing apparatus according to Supplementary note 1, wherein the determination unit determines whether the route is reachable, based on a deterioration characteristic of a SN ratio in a wavelength converter at the second node and a degradation characteristic of a SN ratio in an optical amplifier at the third node with respect to the second wavelength.

(Supplementary Note 3)

The information processing apparatus according to Supplementary note 1 or 2, wherein the specification unit specifies, based on at least one of a communication speed requested by a received route setting request and a degree of importance designated by the route setting request, a priority of the route setting request, specifies, in response to a route setting request of a first priority, a first route for transferring an optical signal having a wavelength as the first wavelength at the second node, based on the first priority, and specifies, in response to a route setting request of a second priority lower than the first priority, a route for converting a wavelength of an optical signal from the first wavelength to the second wavelength and transferring the converted optical signal at the second node, based on the second priority.

(Supplementary Note 4)

The information processing apparatus according to Supplementary note 1 or 2, wherein the specification unit specifies a priority of a received route setting request, based on at least one of a communication speed requested by the route setting request and a degree of importance designated by the route setting request, specifies, in response to a route setting request of a third priority, a route for converting a wavelength of an optical signal from the first wavelength to the second wavelength and transferring the converted optical signal at the second node, based on the third priority, and specifies, in response to a route setting request of a fourth priority lower than the third priority, a route for converting a wavelength of an optical signal from the first wavelength to a third wavelength shorter than the second wavelength and transferring the converted optical signal at the second node, based on the fourth priority.

(Supplementary Note 5)

The information processing apparatus according to Supplementary note 1 or 2, wherein the wavelength converter converts an optical signal of the first wavelength into an electric signal, performs analog signal processing on the electric signal, and then converts the electric signal into an optical signal of the second wavelength.

(Supplementary Note 6)

The information processing apparatus according to Supplementary note 1 or 2, wherein the control unit transmits a response indicating that the route setting is impossible when the determination unit does not determine that the route is reachable.

(Supplementary Note 7)

An information processing method including:

specifying, based on a usage state of a wavelength at each of a first node, a second node, and a third node configured to perform communication using an optical signal, a route for converting a wavelength of an optical signal from a first wavelength to a second wavelength and transferring the converted optical signal at the second node, the route reaching the third node from the first node via the second node;

17

18 determining whether the route is reachable, based on a deterioration characteristic of an SN ratio in a wavelength converter configured to convert a wavelength of an optical signal from the first wavelength to the second wavelength at the second node; and controlling, when determining that the route is reachable, the first node, the second node, and the third node in such a way as to perform communication using an optical signal in the route.

(Supplementary Note 8)

A program causing a computer to execute processing of:

specifying, based on a usage state of a wavelength at each of a first node, a second node, and a third node configured to perform communication using an optical signal, a route for converting a wavelength of an optical signal from a first wavelength to a second wavelength and transferring the converted optical signal at the second node, the route reaching the third node from the first node via the second node;

determining whether the route is reachable, based on a deterioration characteristic of an SN ratio in a wavelength converter configured to convert a wavelength of an optical signal from the first wavelength to the second wavelength at the second node; and controlling, when determining that the route is reachable, the first node, the second node, and the third node in such a way as to perform communication using an optical signal in the route.

(Supplementary Note 9)

An optical communication system including a first node, a second node, and a third node configured to perform communication using an optical signal, and an information processing apparatus, wherein the information processing apparatus includes: a specification unit configured to specify, based on a usage state of a wavelength at each of the first node, the second node, and the third node, a route for converting a wavelength of an optical signal from a first wavelength to a second wavelength and transferring the converted optical signal at the second node, the route reaching the third node from the first node via the second node; a determination unit configured to determine whether the route is reachable, based on a deterioration characteristic of an SN ratio in a wavelength converter configured to convert a wavelength of an optical signal from the first wavelength to the second wavelength at the second node; and a control unit configured to control the first node, the second node, and the third node in such a way as to perform communication using an optical signal in the route when the determination unit determines that the route is reachable.

(Supplementary Note 10)

The optical communication system according to Supplementary note 9, wherein the wavelength converter converts an optical signal of the first wavelength into an electric signal, performs analog signal processing on the electric signal, and then converts the electric signal into an optical signal of the second wavelength.

REFERENCE SIGNS LIST

1 OPTICAL COMMUNICATION SYSTEM
10 INFORMATION PROCESSING APPARATUS
11 SPECIFICATION UNIT
12 DETERMINATION UNIT

13 CONTROL UNIT
20 NODE

What is claimed is:

1. An information processing apparatus comprising:

a specification unit configured to specify, based on a usage state of a wavelength at each of a first node, a second node, and a third node configured to perform communication using an optical signal, a route for converting a wavelength of an optical signal from a first wavelength to a second wavelength and transferring the converted optical signal at the second node, the route reaching the third node from the first node via the second node;

a determination unit configured to determine whether the route is reachable, based on a deterioration characteristic of an SN ratio in a wavelength converter configured to convert a wavelength of an optical signal from the first wavelength to the second wavelength at the second node; and a control unit configured to control the first node, the second node, and the third node in such a way as to perform communication using an optical signal in the route when the determination unit determines that the route is reachable.

2. The information processing apparatus according to claim 1, wherein the determination unit determines whether the route is reachable, based on a deterioration characteristic of an SN ratio in a wavelength converter at the second node and a deterioration characteristic of an SN ratio in an optical amplifier at the third node with respect to the second wavelength.

3. The information processing apparatus according to claim 1, wherein the specification unit specifies a priority of a received route setting request, based on at least one of a communication speed requested by the route setting request and a degree of importance designated by the route setting request, specifies, in response to a route setting request of a first priority, a first route for transferring an optical signal having a wavelength as the first wavelength at the second node, based on the first priority, and specifies, in response to a route setting request of a second priority lower than the first priority, a route for converting a wavelength of an optical signal from the first wavelength to the second wavelength and transferring the converted optical signal at the second node, based on the second priority.

4. The information processing apparatus according to claim 1, wherein the specification unit specifies a priority of a received route setting request, based on at least one of a communication speed requested by the route setting request and a degree of importance designated by the route setting request, specifies, in response to a route setting request of a third priority, a route for converting a wavelength of an optical signal from the first wavelength to the second wavelength and transferring the converted optical signal at the second node, based on the third priority, and specifies, in response to a route setting request of a fourth priority lower than the third priority, a route for converting a wavelength of an optical signal from the first wavelength to a third wavelength shorter than the second wavelength and transferring the converted optical signal at the second node, based on the fourth priority.

5. The information processing apparatus according to claim 1, wherein the wavelength converter converts an optical signal of the first wavelength into an electric signal, performs analog signal processing on the electric signal, and then converts the electric signal into an optical signal of the second wavelength.

6. The information processing apparatus according to claim 1, wherein the control unit transmits a response indicating that a route cannot be set when the determination unit does not determine that the route is reachable.

7. An information processing method comprising:

specifying, based on a usage state of a wavelength at each of a first node, a second node, and a third node configured to perform communication using an optical signal, a route for converting a wavelength of an optical signal from a first wavelength to a second wavelength and transferring the converted optical signal at the second node, the route reaching the third node from the first node via the second node;

determining whether the route is reachable, based on a deterioration characteristic of an SN ratio in a wavelength converter configured to convert a wavelength of an optical signal from the first wavelength to the second wavelength at the second node; and controlling, when determining that the route is reachable, the first node, the second node, and the third node in such a way as to perform communication using an optical signal in the route.

8. An optical communication system comprising a first node, a second node, and a third node configured to perform communication using an optical signal, and an information processing apparatus, wherein the information processing apparatus includes:

a specification unit configured to specify, based on a usage state of a wavelength at each of the first node, the second node, and the third node, a route for converting a wavelength of an optical signal from a first wavelength to a second wavelength and transferring the converted optical signal at the second node, the route reaching the third node from the first node via the second node;

a determination unit configured to determine whether the route is reachable, based on a deterioration characteristic of an SN ratio in a wavelength converter configured to convert a wavelength of an optical signal from the first wavelength to the second wavelength at the second node; and a control unit configured to control the first node, the second node, and the third node in such a way as to perform communication using an optical signal in the route when the determination unit determines that the route is reachable.

9. The optical communication system according to claim 8, wherein the wavelength converter converts an optical signal of the first wavelength into an electric signal, performs analog signal processing on the electric signal, and then converts the electric signal into an optical signal of the second wavelength.

* * * * *